United States Patent Office 3,066,145
Patented Nov. 27, 1962

3,066,145
3-AMINO-6-CHLORO-4-PHENYL-2(1H)-QUINOLONE
Theodore S. Sulkowski, Haverford, Pa., assignor to American Home Products Corporation, New York, N.Y., a corporation of Delaware
No Drawing. Filed Feb. 7, 1962, Ser. No. 171,565
2 Claims. (Cl. 260—288)

This invention relates to a new quinolone derivative having valuable pharmacological properties as an anticonvulsant and tranquilizer. The compound of this invention has the following structure:

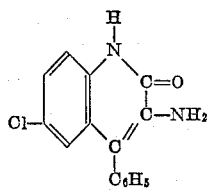

and may be administered orally or parenterally.

This 3-amino-6-chloro-4-phenyl-2(1H)-quinolone may be prepared by a reaction scheme outlined as follows:

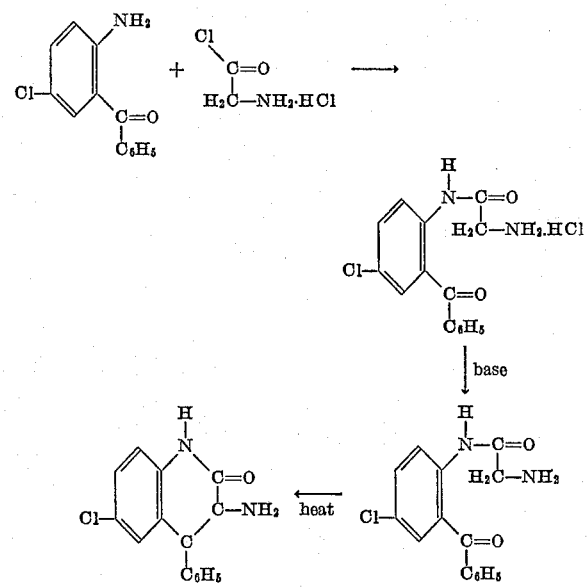

From the foregoing, it will be seen that the novel quinolone of this invention can be prepared by a process which involves acylation of 2-amino-5-chlorobenzophenone with glycyl chloride hydrochloride to form 2-glycylamino-5-chlorobenzophenone hydrochloride, treatment of this product with a base to liberate 2-glycylamino-5-chlorobenzophenone, and cyclization of the latter to yield 3-amino-6-chloro-4-phenyl-2(1H)-quinolone.

The reaction of 2-amino-5-chlorobenzophenone with glycyl chloride hydrochloride is conveniently effected by shaking a suspension of the glycyl chloride hydrochloride in a solution of 2-amino-5-chlorobenzophenone in ether, carbon tetrachloride, chloroform, ethylene dichloride, benzene, petroleum ether, or other convenient inert water-immiscible organic solvent. The 2-glycylamino-5-chlorobenzophenone hydrochloride may then be separated from the reaction mixture by extraction with water. By adding an alkali to the water-extract, the free base, 2-glycylamino-5-chlorobenzophenone is precipitated as a solid. Almost any alkali may be used in liberating the free base; ammonium hydroxide, sodium hydroxide, and sodium carbonate are all satisfactory. The solid 2-glycylamino-5-chlorobenzophenone may then be heated in xylene at reflux temperature for a short time resulting in cyclodehydration and formation of the 3-amino-6-chloro-4-phenyl-2(1H)-quinoline.

The following example illustrates the preparation of 3-amino-6-chloro-4-phenyl-2(1H)-quinolone.

A suspension of 10 grams of 2-amino-5-chloro-benzophenone, 10 grams of glycyl chloride hydrochloride, and 200 ml. of carbon tetrachloride is shaken vigorously for two hours at room temperature. The mixture is then extracted with 150 ml. of water. Neutralization of the water extract with concentrated ammonium hydroxide causes precipitation of a gummy solid, which is separated and boiled with 150 ml. of xylene for forty-five minutes. The mixture is cooled, and the solid which separates is extracted three times with 50 ml. portions of normal hydrochloric acid. The residue is recrystallized from alcohol, giving 3-amino-6-chloro-4-phenyl-2(1H)-quinolone as colorless crystals melting at 239–241° C.

*Analysis.*—Calculated for $C_{15}H_{11}ClN_2O$: C, 66.55; H, 4.10; Cl, 13.10; N, 10.35. Found: C, 66.60; H, 4.14; Cl, 13.00; N, 10.46.

I claim:
1. 3-amino-6-chloro-4-phenyl-2(1H)-quinolone.
2. A process which comprises the steps of agitating a dispersion of 2-amino-5-chlorobenzophenone and glycyl chloride hydrochloride in a neutral, inert, water-immiscible organic solvent and recovering 2-glycylamino-5-chlorobenzophenone hydrochloride, treating a water solution of said 2-glycylamino-5-chlorobenzophenone hydrochloride with an aqueous alkali and thereafter recovering 2-glycylamino-5-chlorobenzophenone, boiling said 2-glycylamino-5-chlorobenzophenone with xylene, cooling the reaction mixture, recovering a solid product, extracting said solid product with a dilute aqueous acid, and crystallizing the acid-extracted residue from an alcoholic solvent, thereby obtaining 3-amino-6-chloro-4-phenyl-2(1H)-quinolone.

No references cited.